United States Patent [19]

Reed

[11] Patent Number: 4,741,526
[45] Date of Patent: May 3, 1988

[54] ADAPTIVE DOUBLES AND LENGTH MEASUREMENT TECHNIQUES AND APPARATUS THEREFOR FOR USE IN SHEET HANDLING AND COUNTING DEVICES

[75] Inventor: John M. Reed, Lebanon, N.J.
[73] Assignee: Brandt, Inc., Bensalem, Pa.
[21] Appl. No.: 822,121
[22] Filed: Jan. 24, 1986
[51] Int. Cl.$^4$ .............................................. B65H 7/14
[52] U.S. Cl. .................................. 271/261; 271/227; 271/263; 271/265
[58] Field of Search ............... 271/227, 259, 261, 265, 271/263

[56] References Cited

U.S. PATENT DOCUMENTS 4,602,778 7/1986 Hirose .......................... 271/261 X
4,630,813 12/1986 Watanabe ...................... 271/259 X Primary Examiner—Richard A. Schacher
Attorney, Agent, or Firm—Shenier & O'Connor

[57] ABSTRACT

Sheet handling and counting apparatus includes a control system having master and slave processors. The slave processor continuously examining passing sheets to measure sheet length and look for doubles. The slave processor generates outputs representative of jam, doubles error, length error and diagnostics as well as detecting the presence of a check separator for stopping the sheet handling and counting apparatus. The master processor controls the sheet apparatus in accordance with the status signals developed by the slave processor, as well as other data derived from sensors interfaced with the master processor. The master processor transmits a control word to the slave processor to control operation of the length measurement according to one of a plurality of selectable tolerances and to select one of a plurality of operating modes for detecting doubles. The slave processor transmits a multibit code word representing the result of the length, doubles and other evaluations for each sheet, the master processor controlling the apparatus in accordance with the evaluation data received from the slave processor. Adaptive techniques are utilized for both length measurement and doubles detection. The length measurement technique permits the accurate counting of sheets, even though they are skewed as they are fed through the apparatus.

24 Claims, 7 Drawing Sheets

4,741,526

ADAPTIVE DOUBLES AND LENGTH MEASUREMENT TECHNIQUES AND APPARATUS THEREFOR FOR USE IN SHEET HANDLING AND COUNTING DEVICES

FIELD OF THE INVENTION

The present invention relates to apparatus for controlling the feeding and counting of sheets and more particularly to novel controls including interacting master and slave processors in which adaptive length measurement and adaptive doubles techniques are utilized for examining sheets fed through the apparatus.

BACKGROUND OF THE INVENTION

U.S. Pat. No. 4,474,365, issued Oct. 2, 1984 and assigned to the assignee of the present application, discloses apparatus for high speed handling and counting of a variety of sheet-like documents such as paper currency, checks, food stamps and the like. It is obvious that counting accuracy is extremely important when counting and batching paper currency and especially large denominations thereof.

A variety of techniques exist for examining the sheets being handling and counted to assure accurate sheet counts even though the sheets may be skewed and/or fed in overlapping fashion as they are handled and counted.

Co-pending application Ser. No. 820,981, filed Jan. 21, 1986 and assigned to the assignee of the present invention discloses techniques for length measurement and doubles detection. The present invention discloses control circuitry and techniques which provide improvements over those described in the aforementioned co-pending application.

BRIEF DESCRIPTION OF THE INVENTION

The present invention provides novel control means for use in sheet handling and counting apparatus and utilizing master and slave processors. The slave processor continuously examines sheets, developing length, doubles and check separator evaluation data which is transferred to the master processor after the examination of each sheet to enable the master processor to exert appropriate control over the handling and counting apparatus. The master processor monitors all sensors and switches and controls all other functions including control of the operating mode and tolerance settings utilized by the slave processor in the performance of the above functions.

The length measurement is an adaptive technique which obtained through the use of an encoder mounted upon the feed wheel shaft and which generates pulses at a rate dependent upon the handling speeds of the apparatus which is typically between 500 and 1500 sheets per minute. Length measurements are generated for two separate parallel tracks and include a start and a stop count. The differences between the start counts is utilized to determine a skew conpensation factor which is selected from a look-up table. The track length measurements developed for each sensor are compared to determine the presence of half-notes, severely skewed sheets and the like. Note length is determined using the track lengths and the skew compensation factor. A continuously updated average note length is developed and an error value is obtained from the difference between note length and average length. The error value is compared against the selected tolerance level to determine whether the measured length is acceptable, i.e. is within the tolerance range.

The sheet density technique is an adaptive technique in which an analog signal representative of instantaneous sheet transmissivity is periodically sampled and converted into digital form at various intervals during the time that the sheet passes the sensors. These digitized values are averaged. The low and high average density values are stored in memory and these stored values are continuously compared with each successively determined average density value to update the high and low density values. These steps are repeated for successively fed sheets. The updated stored values are employed as the criteria for determining the presence of double fed sheets. Whenever the last stored high density value exceeds the stored low density value by a predetermined quantity, which may be a selected one of a plurality of thresholds determined by the master processor, a doubles indication is generated. Length and doubles evaluation data for each examined sheet is transferred to the master processor which exerts appropriate control over the sheet handling and counting apparatus. The master processor monitors the keyboard and updates the display, performs the counting function and operates the motor, clutch and brake for stopping, starting and batching operations, detects counterfeit detection signals and if desired, communicates with a remote processor for the transfer of counting data, providing denomination totals in dollar values and other data. The slave processor examines documents for the presence of a check separator and generates a stop request when a check separator is present, causing the master processor to stop the machine.

The master processor shares the use of the sheet sensors with the slave processor for generating a valid count based upon the data received from the slave processor and either continuing normal counting or halting the handling and counting operation upon completion of a batch or the presence of a check separator, depending upon the data received from the slave processor.

The above described shared processing technique enables the performance of numerous parallel functions to provide high speed, real-time operation even at high sheet handling speeds.

OBJECTS OF THE INVENTION AND BRIEF DESCRIPTION OF THE FIGURES

It is therefore one object of the present invention to provide novel control means for determining transmissivity and sheet length of sheets being fed at high speed through a document handling and counting apparatus.

Another object of the present invention is to provide novel apparatus for determining the presence of multi-fed sheets through the use of a novel adaptive technique.

Still another object of the present invention is to provide a novel device for determining sheet length through the use of a novel adaptive technique.

Still another object of the present invention is to provide novel method and apparatus for determining sheet length which takes into account skewing of the sheets being examined.

Still another object of the present invention is to provide novel apparatus including interacting master and slave processors for respectively controlling the handling and counting apparatus and for determining sheet length and transmissivity.

The above as well as other objects of the present invention will become apparent when reading the accompanying description and drawing in which.

Figure 2B:
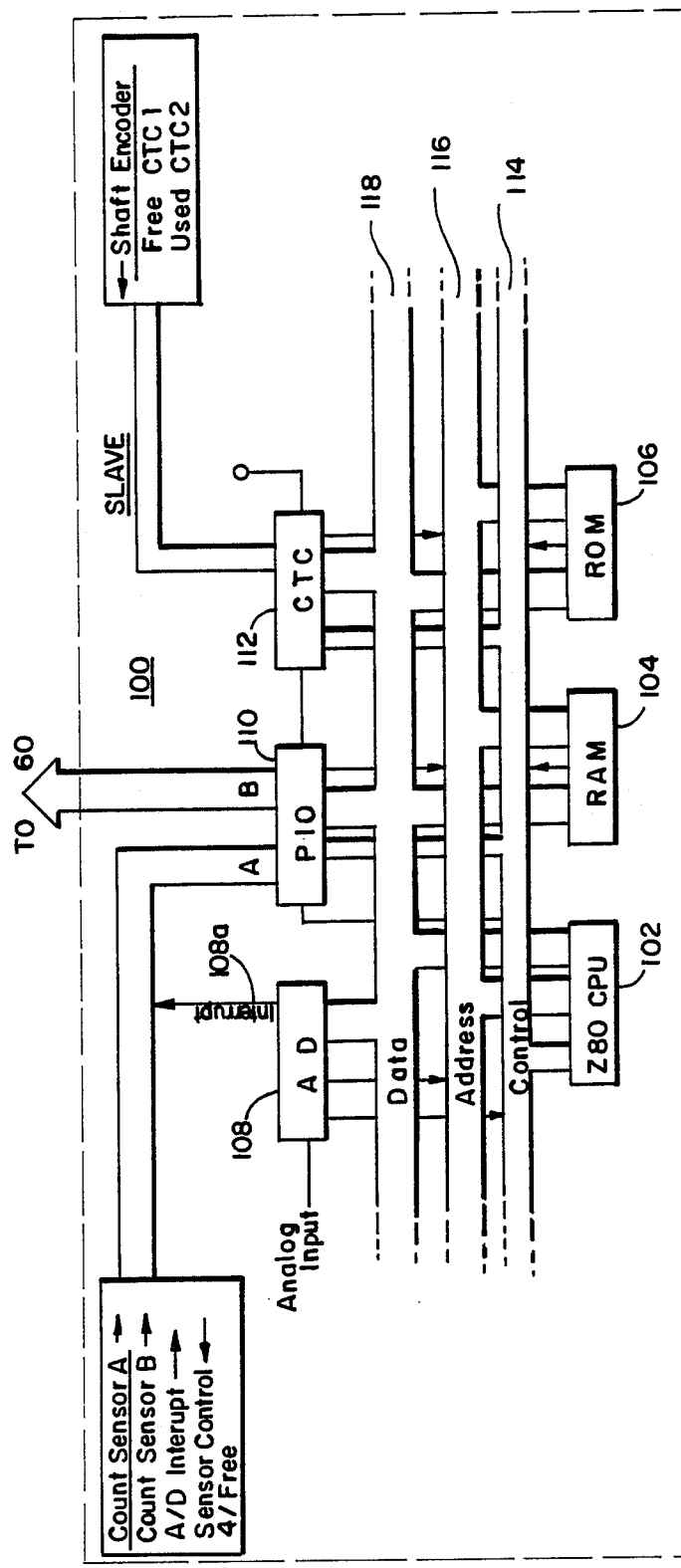
Figure 2A:
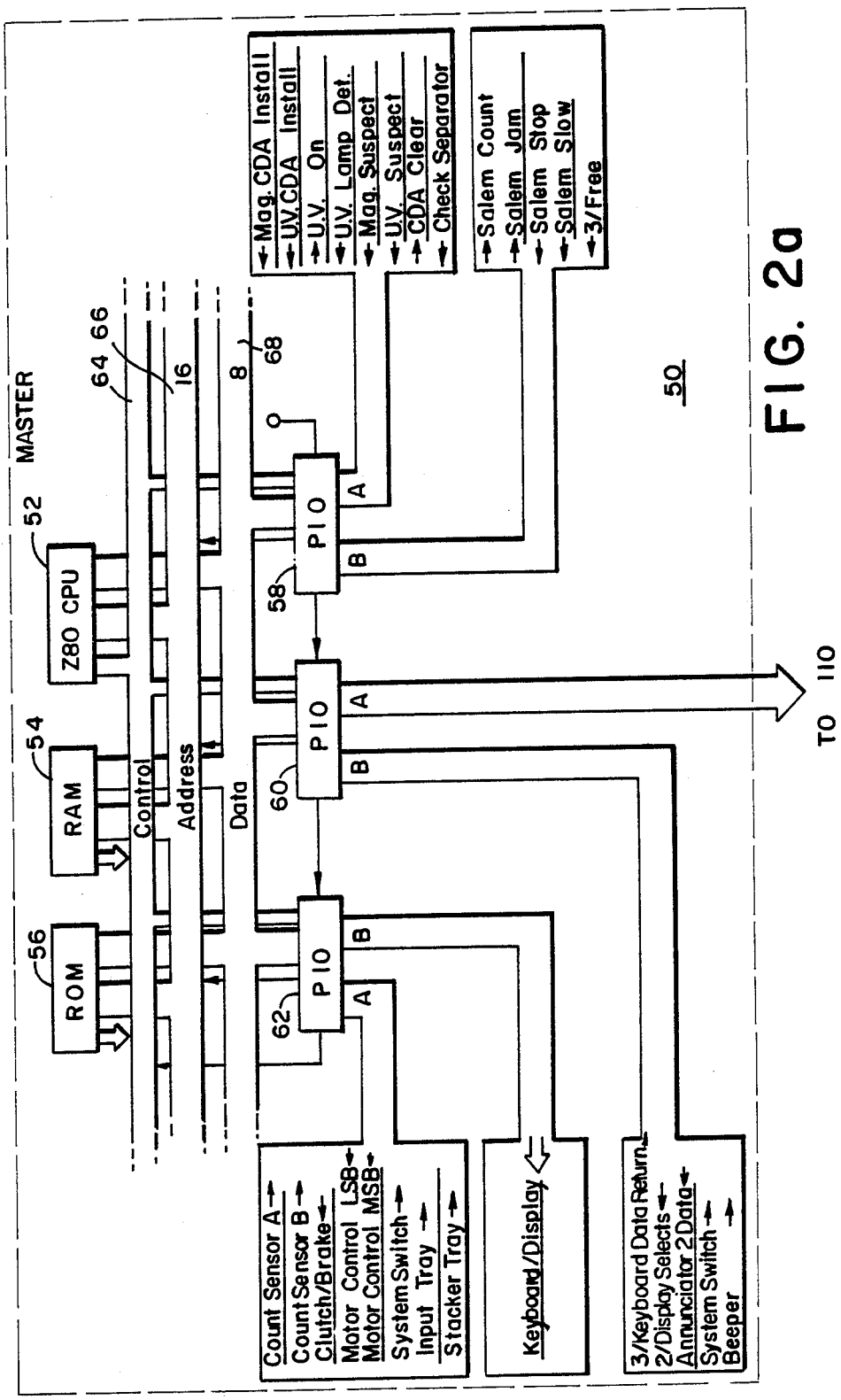

FIGS. 2a and 2b together comprise a simplified block diagram showing the control apparatus of the present invention.

Figure 3A:
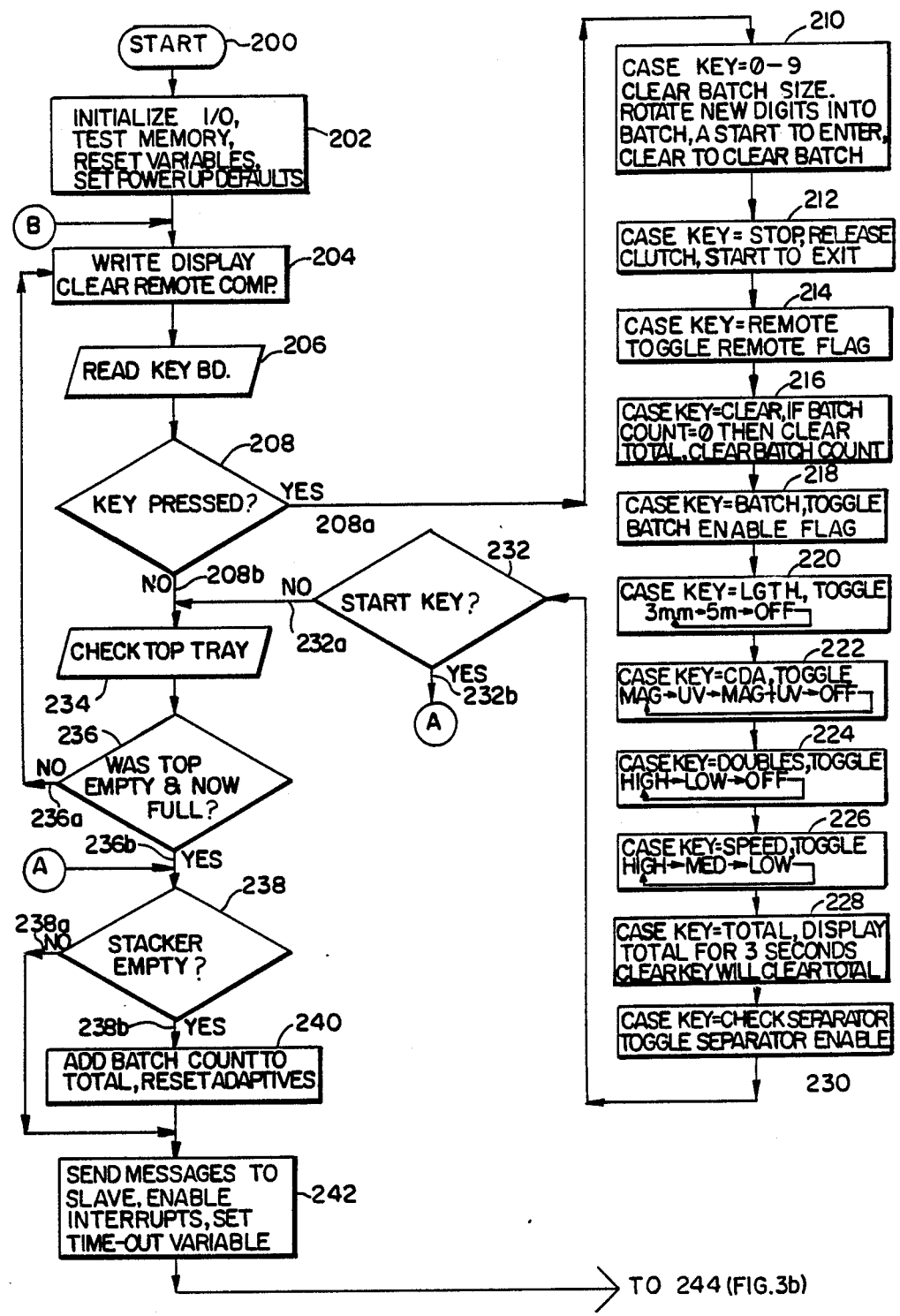
Figure 3B:
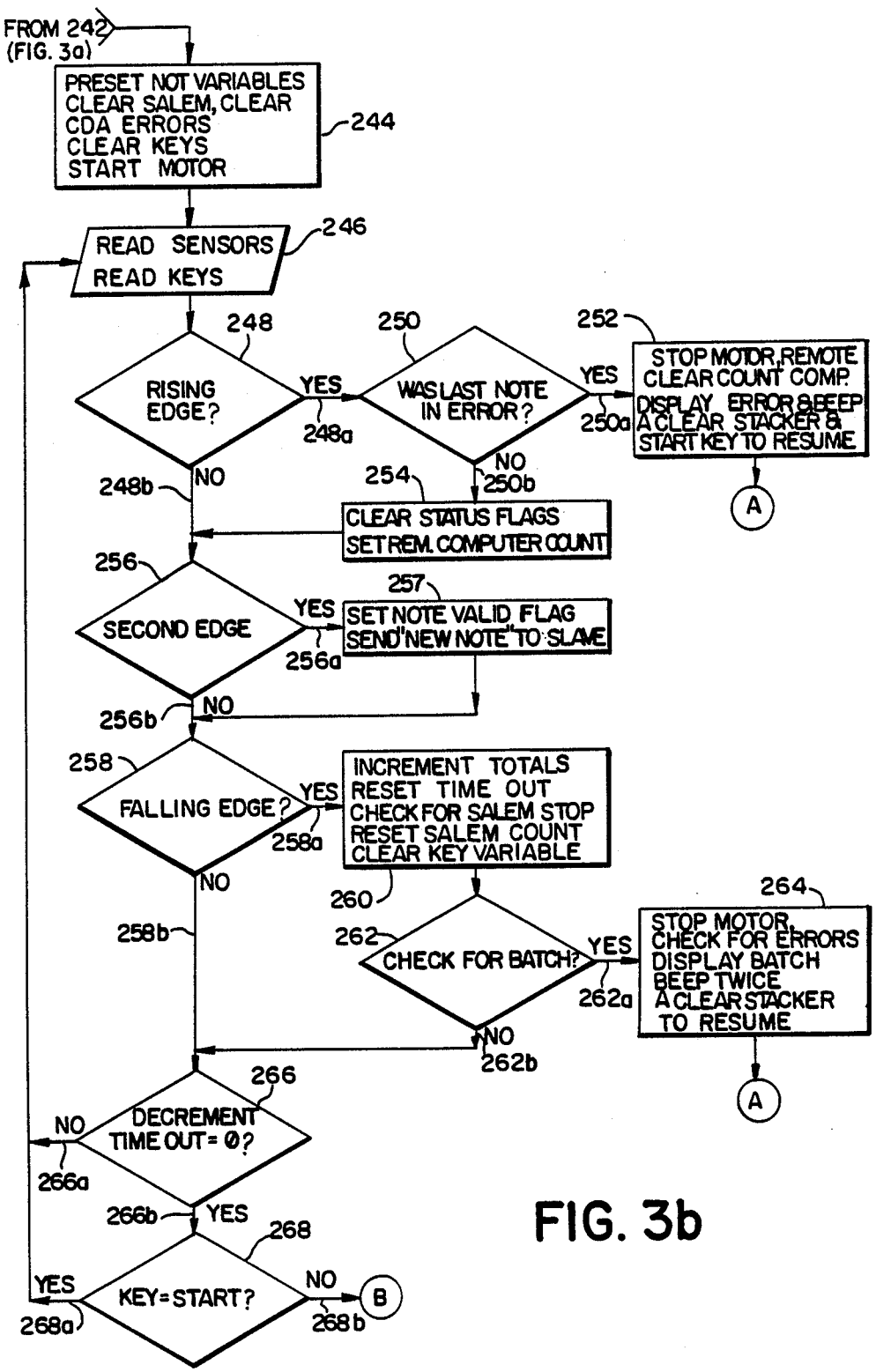

FIGS. 3a and 3b, taken together, show a flow diagram useful in explaining the operation of the master processor of FIGS. 2a and 2b.

FIGS. 4a through 4e are flow diagrams useful in explaining the operation of the slave processor of FIG. 2.

DETAILED DESCRIPTION OF THE INVENTION

Figure 1:
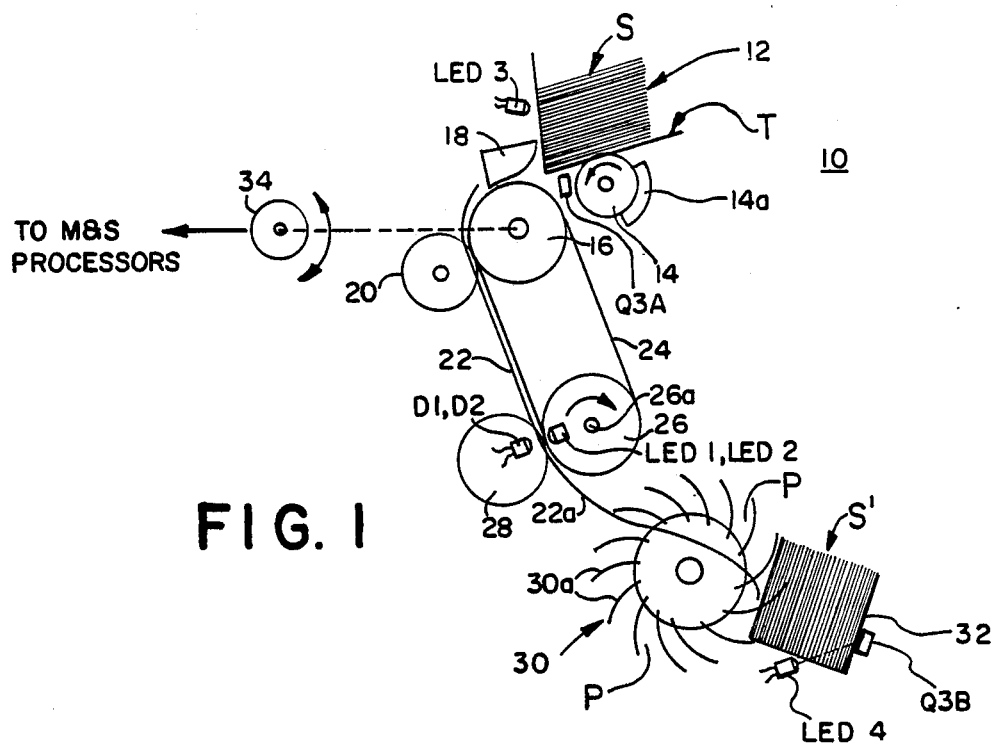
FIG. 1 is a simplified block diagram of document handling and counting apparatus which may be controlled using the control apparatus of the present invention.

FIG. 1 shows a simplified view of a document handling and counting device 10 having an input tray 12 receiving a stack of sheets such as paper currency, food stamps, bank notes or any other sheets appropriate for handling or counting. A rotatable kicker wheel 14 has an eccentric portion 14a which periodically protrudes through an opening in the bottom of the tray T, advancing the bottom sheet toward a feed nip defined by a feed roller 16 and stripper shoe 18. The feed nip feeds documents one at a time in the forward feed direction between guideway 22 and O-rings 24 entrained about acceleration drive rollers 26 and acceleration driven rollers (not shown) rotatable about a common axis with feed roller 16. Idler 20 cooperates with feed roller 16 to advance sheets toward the acceleration drive roller 26 and a cooperating roller 28 which forms an acceleration nip with the O-rings 24. O-rings 24 and guideway 22 cooperatively form a guideway along which sheets are moved from the feed nip and towards acceleration nip. Sheets entering the acceleration nip are accelerated to form a gap between successively fed sheets, which gap facilitates the counting operation.

A pair of light sources LED1, LED2 arranged in spaced fashion cooperate with a pair of photosensitive diodes D1, D2 similarly arranged in spaced fashion to sense the passage of sheets for use in counting, doubles detection and length measurement as will be more fully described hereinbelow. Counting is performed by the master processor while doubles detection and sheet length are performed by the slave processor.

Sheets leave the acceleration nip and are advanced along guideway portion 22a where they enter into one of the pockets P formed between a pair of adjacent curved resilient blades 30a of rotating stacker wheel 30. An output tray 32 strips sheets from the pockets P of stacker wheel 30 and accumulates these sheets to form a stack S' therein.

Light source LED3 and sensor Q3a which may, for example, be a phototransistor, are utilized to detect the presence of sheets in the input tray T. A similar light source LED4 and phototransistor Q3B are utilized to detect the presence or absence of sheets in the output tray 32.

Figure 1A:
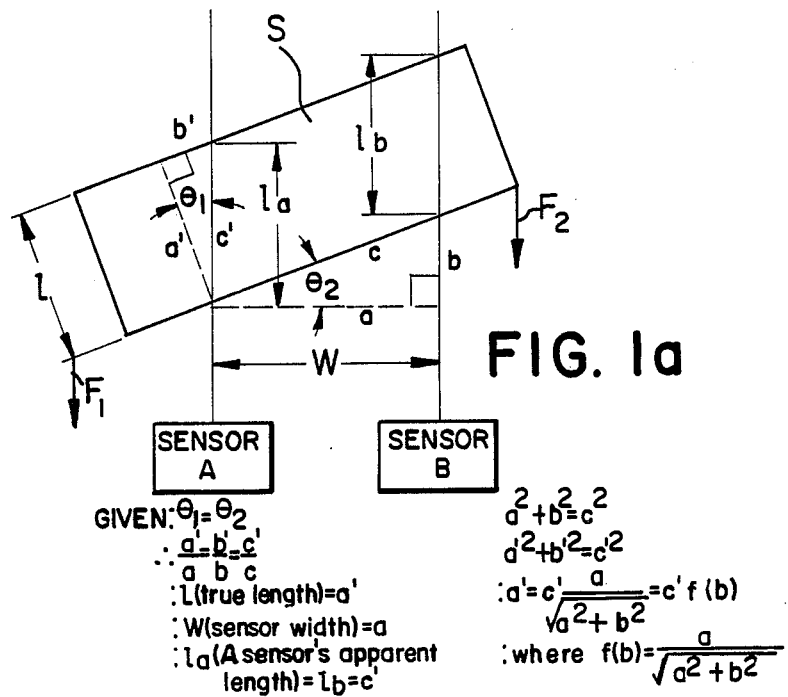
FIG. 1a is a diagram useful in explaining the length measurement performed by the sensors of FIG. 1.

FIG. 1a shows a sheet S having a real length 1 in the feed direction and moving toward the sensor A and B locations as shown by the feed direction arrows F1 and F2. Sensors A and B correspond to the sensors D1 and D2 of FIG. 1, it being understood that, in the example shown in FIG. 1a, sheet S is skewed relative to the normal sheeet orientation. The present invention, however, makes it possible to accurately count sheets whether they be properly fed or skewed relative to the normal feed orientation.

The width w between sensor A and B being fixed, the values of the distances a, b, c, a', b', c', $1_a$, $1_b$ and the actual length 1 (all shown in FIG. 1a) are determined in accordance with the equations set forth as part of Fig. 1a. The measurements b, $1_a$ and $1_b$ are obtained through the cooperation of sensors A and B, encoder 34 (FIG. 1) and the slave processor to be described hereinbelow in order to obtain true document length 1 in accordance with the equations shown in FIG. 1a. Each skew factor f(b) is stored in a look-up table in memory so that the address of each skew factor is the value b. For example, given a skew angle of 45°, b=W and the skew factor f(b) is equal to the square root of 2 ($\sqrt{2}$) or, in other words, the actual length of the skewed sheet is equal to the apparent length divided by the square root of 2, i.e. $a' = C'/\sqrt{2}$. As another example, given that the value b=0, i.e. when the skew angle is 0°, f(b)=1, i.e. the apparent length of the sheet is equal to the actual length, or $$f(b) = \frac{1}{\sqrt{l^{21}}} = 1.$$

The skew compensation values are preferably stored in successive memory locations whose addresses represent each of the possible values b. A table look-up technique is employed wherein the value determined for the quantity b is utilized to select the appropriate compensation factor which is stored in the memory location whose relative address is the value b.

A detailed description of the slave processor and its mode of operation will be set forth hereinbelow.

FIGS. 2a and 2b together show a simplified block diagram of the system electronics which is comprised of a master processor portion 50 and a slave processor portion 100. The master processor 50 includes a central processing unit (CPU) 52 which may, for example, be a model Z80 microprocessor; a random access memory (RAM) 54; a read only memory (ROM) 56 and parallel input/output (PIO) circuits 58, 60 and 62. CPU 52 communicates with circuits 54 through 62 by way of control bus 64, address bus 66 and data bus 68.

The parallel input/output devices interconnect the master processor with external devices, including the slave processor system 100. More specifically, PIO 58 selectively couples the master processor to sensing devices including a magnetic sensor, an ultraviolet sensor and a check separator switch. The master microprocessor 50 also controls the operation of the magnetic detection apparatus through PIO 58 to clear the magnetic sensing device after a CDA error has occured.

CPU 52 operates under control of a standard program for operating apparatus 10, including all optional features which may be incorporated into apparatus 10. However, certain features of the program may not be included in the apparatus 10. As a result, CPU 52 looks for a U.V. CDA installed condition before turning on the U.V. lamp. The CPU 52 then looks to see if the U.V. lamp is on and thereafter looks for a U.V. suspect condition. Which is derived from a U.V. sensor described, for example, in U.S. Pat. No. 4,114,804, issued June 29, 1978 and assigned to the assignee of the present application.

Likewise, CPU 52 looks for a Mag. (magnetic) CDA installed signal before looking for a Mag. Suspect signal. When either a Mag. or a U.V. Suspect signal is detected, a clear signal is transmitted to the CDA unit.

The two-position check separator switch, depending upon its position, tells CPU 52 that a check separator sub-routine should (or should not) be performed.

PIO 58 also interfaces with a remote computer through lines coupled to its port B to transfer information regarding a count and a jam condition and further receives signals from the remote computer indicating that the remote computer requests that the master processor either slow down or stop.

When a document is fed the Salem Count line transmits a count of one bill to the remote computer. If a jam or other error is detected in apparatus 10, CPU 52 sends a jam signal (SALEM Jam) to the remote computer. If the remote computer stops for any reason (SALEM Stop), this condition is transmitted to CPU 52. If the remote computer is operating at a slower speed this condition is conveyed to CPU 52 which reduces the operating speed of the apparatus 10. The system also has some free, i.e. unused lines (3/Free) which may be used in the future for any purpose.

PIO 60 interfaces master processor 50 with slave processor 100 through a group of lines A which are interfaced with the slave CPU 102 through a PIO 110 provided in slave processor system 100.

PIO 60 further interfaces the master processor with the keyboard, the display, the annunciator, the systems switch and the beeper. PIO 62 selectively couples the master processor with the A, B count sensors, the clutch/brake, the motor control, the systems switch, the input tray and the stacker tray. The arrow associated with each external device indicates the direction of the signals moving between the master processor and the external devices. Arrows directed toward CPU 52 provide signals to the CPU. Arrows directed away indicate control exerted over the device by CPU 52.

Three return lines (3/Keyboard Data Return) are coupled to CPU 52 through PIO 62. These lines are used to indicate closure of keyboard keys when the keyboard is scanned through a conventional scan routine.

The 2/Display Selects comprise two lines used to select the display circuits used to illuminate the display.

The Annunciator 2 Display comprises two lines used to select one of the words capable of being presented upon the display (such as DBL, ERROR, etc).

The System Switch and Beeper each comprise a switch (having two states) whose condition is examined by CPU 52 to determine if a certain sub-routine should be performed, such as energizing a beeper.

PIO 62 coupled scan signals from CPU 52 to the keyboard and display (Keyboard/Display) through its port B for operating i.e. scanning the keyboard and operating the display.

Port A of PIO 62 couples signals from the sensors (Count Sensor A, Count Sensor B, Input Tray and Stacker Tray) to CPU 52.

The clutch and brake are activated by CPU 52 through a line (Clutch/Brake) coupled to CPU 52 through PIO 62.

The motor is capable of operating in four different states: high, medium and low speeds and off. Two lines (Motor Control LSB, Motor Control MSB) couple a two bit binary word to the motor to select one of the four possible motor operating conditions. The system switch is used to identify a particular feature of the apparatus 10 such as a variable batch keyboard, or a fixed batch keyboard. An indication of the type of keyboard enables CPU 52 to select the sub-routine suited for the type of keyboard being used. The variable batch keyboard allows selection of any size batch i.e. 27, 43, 51 sheets per batch, for example. The fixed batch keyboard limits batch size to selected values such as 25, 50, 100, 200.

Slave processor 100 is comprised of circuit devices similar to those employed in the master processor including CPU 102, RAM 104, ROM 106, and PIO 110. In addition thereto the slave processor 100 includes A to D convertor 108 and counter-timer-clock CTC 112. CPU 102 interfaces with each of the circuits shown through control bus 114, address bus 116 and data bus 118. PIO 110 interfaces with PIO 60 of master processor 50 as well as the A and B count sensors and the A to D interrupt line 108a. Five lines (5/Free) are available for future use.

The CTC 112 has four channels (0 through 3) each containing a down counter capable of generating a signal when decremented to zero. Channel 0 is free for future use (Free CTCl). Channels 2 and 3 are coupled to the 4MHz clock of CPU 102.

The CPU 102 software routine loads a value into the counter in CTC 112 coupled to channel 2 as a bill passes the sensor (A and B). The down count terminates 200 msecs later. At that time the sensors (A and B) are examined. If a bill is still underneath a sensor (A or B) this is considered to be a jam.

The CPU 102 software routine loads a value into the channel 3 counter. When this counter reaches zero, a sensor (A or B) is selected by toggling a flip-flop through a Sensor Control line coupling the flip-flop to CPU 102 through PIO 110. The selected sensor (A or B) is examined and if a document is under the selected sensor, an interrupt signal is generated (A/D Interrupt) whereupon the CPU 102 instructs A/D converter 108 to initiate an A/D conversion when a document is under a sensor. If no document is under the sensor, then no A/D conversion is initiated, the flip-flop is toggled and the other sensor is operative during the next sampling interval. CPU 108 then returns to the program step being performed before the interrupt generated by CTC 112. The A/D converter generates an interrupt signal 108a when the conversion is complete. The binary value generated by A/D converter 108 is transferred to CPU 102 through PIO 110. The digital value is stored in a suitable location in memory for subsequent processing. The aforementioned value is again loaded into channel 3 of CTC 112 which begins a new interval. The technique of developing density samples from sensors in alternating fashion and ignoring density samples when no document is under a sensor assures the development of samples over substantially the entire length of sensor tracks.

The value loaded into the channel 3 counter of CTC 112 is a function of the feed speed and is selected to cause in the range of twenty to sixty interrupt signals during the passage of a sheet to assure the generation of a like number of density values by A/D converter 108.

FIGS. 3a and 3b together comprise a flow chart useful in explaining the operation of the master processor. Upon turn-on of the power switch, the processor enters the program at 200 and performs conventional "housekeeping" functions at 202 including initialization of the input/output circuits, testing the memory, resetting variables and setting the power-up defaults.

At 204, the display is energized and the remote computer (not shown) which may be coupled to master processor 50 is cleared in those applications where a remote computer is interfaced with the master processor.

At 206, the processor scans the keyboard which is comprised of numeric keys 0-9, and function keys including total, clear, doubles, size, magnetic sensing (CDA), speed, remote, start and stop. If a key has been pressed, the program branches at 208a to examine each of the possible key conditions listed at 210 through 230 and to perform an operation in accordance with which of the keys mentioned therein is depressed. After scanning through all of the possible key operations, the program returns to step 232. If the start key has not been depressed, the program branches at 232a. When the start key is depressed, the program branches at 232b to enter program step 238. If the start has not been depressed, the program checks the top tray sensor Q3A at 234. At 236 if the top tray was empty and is now full, the program branches at 236b to determine if the stacker is empty at 238 by examining the sensor Q3B in the output stacker.

Returning to step 236, if the input tray is not full, the program branches at 236a to return to step 204 and continues to loop until a stack of paper currency is placed in the input tray.

When paper currency is placed in the input tray, the program branches at 236b to examine the output stacker sensor Q3B. If there is no stack in the output stacker, the program branches at 238b to add a batch count to the total and to reset adaptives i.e. to reset the length and doubles values stored during the adaptive length and adaptive doubles evaluations performed when the last batch of bills were examined. As soon as the batch of bills are removed from the output stacker all of the stored length and doubles values are cleared causing new values to be generated for the next batch of bills to be examined. In the event that the stacker is not empty, the program branches at 238a to step 242, bypassing step 240 and transmitting a message to the slave processor 100, enabling the interrupts and setting the adjustable time out interval which causes the program to return to step 204 in the event that no sheets are detected during the time out interval.

The master processor 50 then advances to step 244 at which time the note variables are preset, the remote computer is cleared, the keys are cleared and the suspect currency error (CDA) is cleared, the motor is started and the apparatus of FIG. 1 thus begins to feed and count paper currency.

At step 246, the keyboard is scanned and the A and B sensors are read. At 248, if a rising edge is detected as being generated by one of the sensors, indicating the passage of a leading edge of a sheet, the program branches at 248a and at 250, examines the information transferred to the master processor from the slave processor indicating the status of the last examined bill. The slave processor sends an interrupt signal to the master which receives and stores the status code from the slave upon receipt of the interrupt as will be more fully described. If the last examined bill was in error, the program branches at 250a and advances to step 252 at which time the motor is turned off, the count is cleared, an error condition is displayed and an audible error signal is generated. The stacker and start key status conditions are then cleared and the program returns to step 238a.

In the event that the last note was not in error, the program branches at 250b to clear the status flags and to set the remote computer count.

The program then advances to step 256.

In the event that the rising edge is not the first leading edge detected, the program branches at 248b, advancing to step 256 to examine for a second edge. If the rising edge is a second edge, the program branches at 256a to set the "valid note" flag and to send a "new note" signal to the slave processor 100.

In the absence of a second edge, i.e. assuming a leading edge has been detected by both the A and B sensors, the program branches at 256b and examines for a falling edge (i.e. the traling edge of a sheet) at 258. When a falling edge is detected, the program branches at 258a to step 260 and increments totals, resets the time out interval, checks for a stop in the remote computer, resets the remote computer count and clears the key variables and thereafter advances to step 262 to check for the completion of a batch. If the count has completed a batch, the program branches at 262a to 264 to stop the motor, check for errors, display the batch, beep twice and clear the stacker to resume.

Assuming the apparatus is batching (i.e. forming batches of 100 sheets, for example) in the event that the count does not complete a batch, the program branches at 262b to decrement the time out interval and check to determine if the time out interval has reached 0. If the time out interval has not reached 0, the program branches at 266a to return to the program step 246 which was explained hereinabove. In the event that the decremented time out count has reached 0 the program branches at 266b to look for a key start. If no key start has occurred, the program branches at 268b to return to program step 204 which was explained hereinabove. In the event that the start key has been depressed, the program branches at 268a to return to program step 246.

Upon completion of a batch and all of the steps which take place at step 264, the program returns to step 238 which was explained hereinabove.

The slave processor 100 transfers data to the master processor in an asynchronous fashion. The slave processor 100, as will be more fully described hereinbelow, completes its evaluation after the occurrence of a falling edge (i.e. the trailing edge of a sheet) and prior to the occurrance of a rising edge (i.e. leading edge of the next sheet). Thus, the result of the length measurement and doubles detection tests for a bill are obtained after the trailing edge of the bill has passed the sensors and these results transferred to the master processor 50 and made available to the master processor for evaluation through the slave PIO 110 and the master PIO 60, as shown in FIG. 2. The slave transmits a four bit binary message to the master through PIO 110 and PIO 60. The first bit is an interrupt bit causing CPU 52 to interrupt when the interrupt bit is in a predetermined binary state (i.e. "high" or "low"). The remaining three bits comprise the message and the binary state of these bits constitute the condition of the examined bill regarding length and density.

The use of two separate processors thus enables the simultaneous performance of a plurality of operations.

Figure 4A:
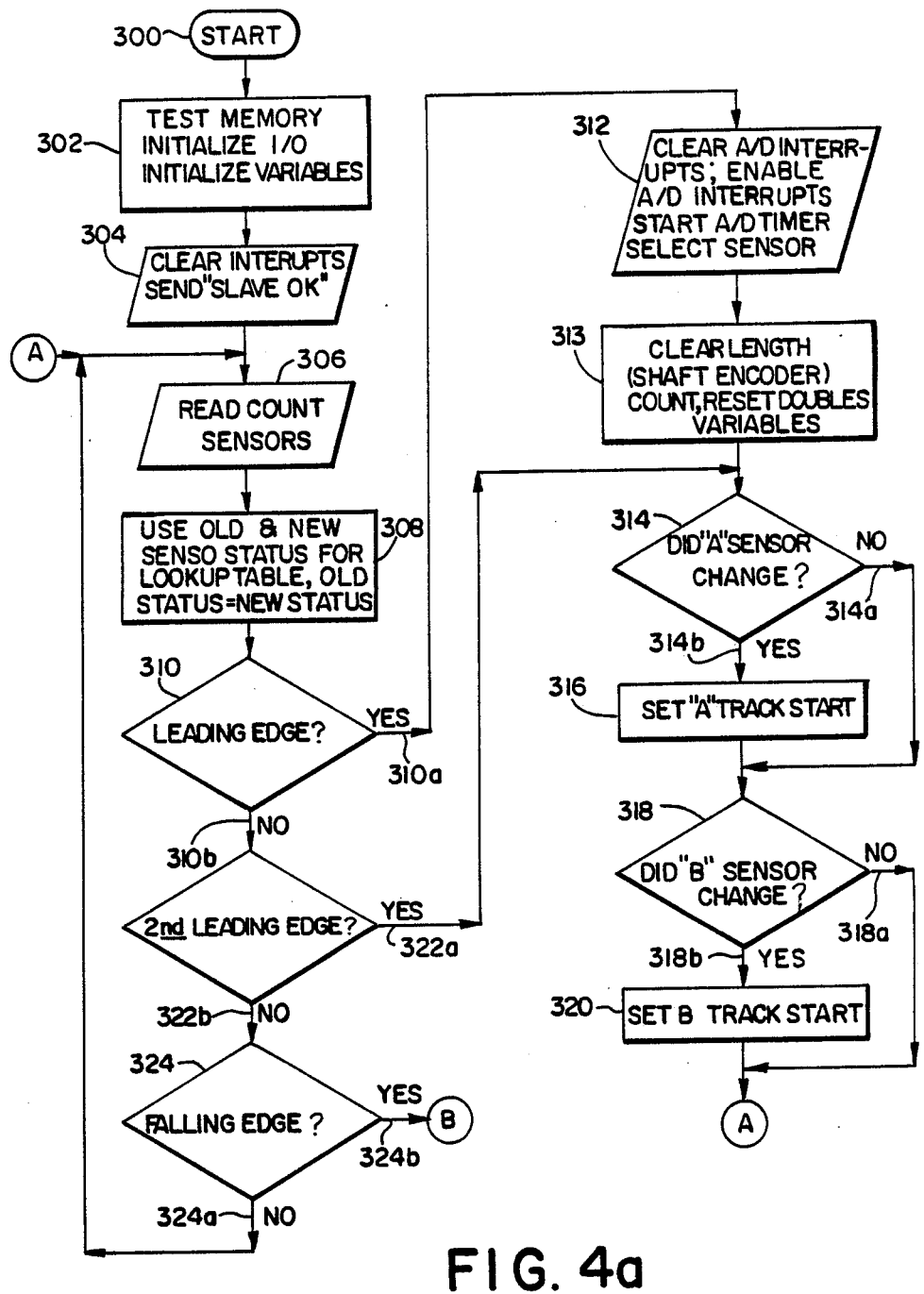

FIG. 4a is a flow chart showing the manner in which length data is accumulated.

At step 242 shown in FIG. 3, the master processor 50 transfers data to the slave processor 100 for setting the density level and the length measurement tolerance value prior to initiation of the feeding of documents, which occurs at step 244. The slave unit is thus started at 300 and advances to step 302 at which time the memory is tested, the input/output units are initialized and the variables are initialized, in accordance with those preset in the slave processor memory and further in accordance with the data received from the master processor through step 242 shown in the flow chart of FIG. 3a.

Thereafter, the slave transmits the "slave okay" signal to the master, through slave PIO 110 and master PIO 60.

At step 306, the count sensors A and B are read and the previous "new status" conditions (i.e. absence of a sheet) are adopted as the "old status" conditions.

The slave processor looks for a leading edge at step 310. If a leading edge is present, the program branches at 310a to: clear the A/D interrupts; enable the A/D interrupts; start the A/D timer (CTC 112) and select the sensor (by toggling the flip-flop used to select one of the sensors (A or B). The selected sensor is examined and if a document is under the selected sensor the A/D timer is initiated. If no document is under the selected sensor the A/D timer is not initiated for that sensor. The program then advances to step 313 to clear the length count developed by the shaft encoder at 312; and reset the doubles variables. The shaft encoder, which is shown in FIG. 1, is a rotatable shaft encoder coupled to rotate with the feed wheel shaft and generating pulses at a time rate which is a function of the feed wheel shaft RPM. These pulses are utilized as length measurement pulses which are accumulated in a counter and more specifically one of the counters in the counter-timer-clock CTC 112 coupled to the shaft encoder. Thus, the first sensor which detects the leading edge of a sheet initiates a count in one of the counters in CTC 112, which count is developed by pulses from the shaft encoder.

The slave processor then determines if the A sensor has changed state at 314, by comparing the A sensor present state with the A sensor old status. If the A sensor has not changed state, the program branches through 314a to step 318. If the A sensor has changed its status, the program branches at 314b to set the A-track start value developed in CTC 112 into a suitable memory location in RAM 104. Thereafter, slave processor 100 looks for a change in the B sensor status at 318. If the B sensor has not changed status, the program branches at 318a to return to program step 306. If the B sensor changes status, the program branches at 318b to set the B track start count generated in CTC 112 into a suitable storage location in processor 100, which count represents the count developed by CTC 112 at the time a status change in the B sensor is detected.

After a first leading edge has been detected (see step 310) the processor looks for a second leading edge at 322. If a second leading edge is detected, this leading edge is examined to determine if it is a change in the A or B sensor. Thereafter, the program again returns to step 306.

Figure 4B:
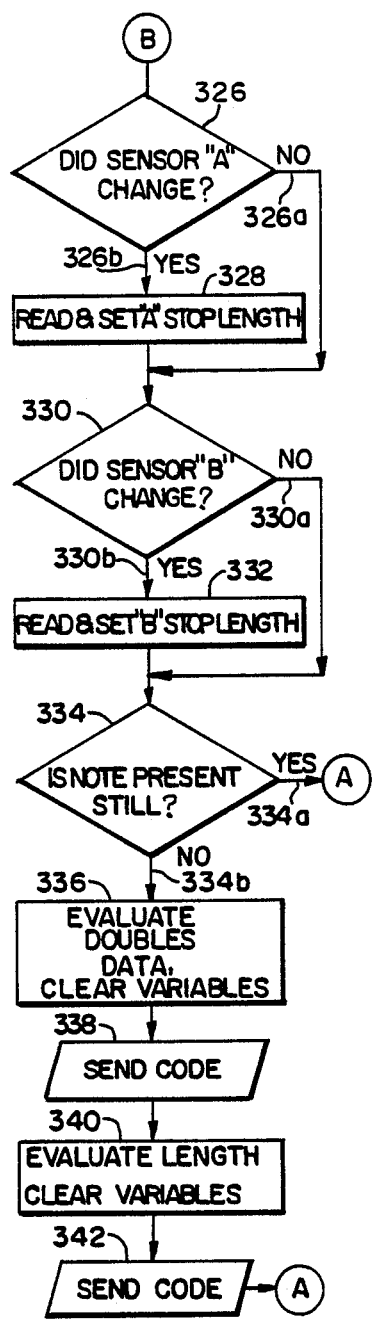

After both leading edges have been detected, the slave processor then looks for the occurrence of a falling edge at 324 and continues to loop from branch 324a to step 306 until the occurrence of a falling edge. When a falling edge (i.e. trailing edge of a sheet) is detected, the program branches at 324b and enters step 326 shown in FIG. 4b to determine if the falling edge change was the A sensor or at step 330 to determine if the falling edge was the B sensor. If the edge was not the A sensor, the program branches at 326a to step 330. If the A sensor changed its status, the program branches at 326b to read and set the A stop length at 328 whereby the count generated by the shaft encoder at the time that a falling edge was encountered by the A sensor is inserted into a storage location in processor 100. Steps 330 and 332 perform similar functions for the B sensor. The program then advances to step 334 to determine if a note is still present. If a note is still present, indicating that both falling edges have yet to be detected, the program branches at 334a and returns to program step 306 shown in FIG. 4a. The slave processor 100 will remain in this loop until the second falling edge is detected and the note has passed whereupon the program branches at 334b to step 336 to enter a sub-routine to evaluate the doubles data and clear variables at 336, which program is shown in FIG. 4c, and to thereafter transmit the code representing the results of the doubles evaluation. As was described hereinabove, this code is accompanied by an interrupt bit which causes CPU 52 to interrupt processing to receive and store said code. The program thereafter evaluates the length data at 340, which sub-routine is shown in FIG. 4d, and thereafter transmits the code representing the result of the length evaluation at 342. This code is also accompanied by an interrupt bit. The program then returns to the program step 306 shown in FIG. 4a. The program steps described hereinabove are repeated for each sheet processed.

Density data is obtained by sampling the outputs of the A and B sensors in alternating fashion and converting these values into digital form. In the preferred embodiment about twenty (20) density samples are obtained from each sensor. The sampled signal, which is an analog signal, is applied to an analog to digital (A/D) converter 108 which converts the analog signal to a 16 bit binary digital representation appearing at the A/D output terminals 108b. This data is transmitted through the data bus 118 to CPU 102 for appropriate evaluation.

In the preferred embodiment, when the first leading edge is detected, the sensor is sampled after a predetermined time interval if a document is covering the sensor. The A/D conversion is performed and the digitized value is stored. The flip-flop used to select one of the sensors is toggled (through Sensor Select - FIG. 2) the selected sensor is examined and, if a document is covering the selected sensor, an A/D conversaion is initiated. If no document is covering the selected sensor no A/D conversion is initiated. The A/D converter 108 is periodically activated by an interrupt signal from CTC 112. The A/D converter responds to the interrupt signal by performing an A/D conversion, if a document is under the sensor being sampled. When the conversion is completed A/D converter 108 generates an interrupt signal 108a which is coupled to CPU 102 through PIO 110.

The A/D converter 108 converts the continuous analog signal presented at its input into a digital representation thereof a plurality of times during the passage of each paper bill. In one preferred embodiment, the A/D converter generates a digital output at about 40 different intervals during the time in which it takes for a paper bill to pass the sensors A and B, generating 20 samples per sensor. By toggling between sensors A and B and bypassing an A/D conversion operation when no sheet is covering the selected sensor this technique assures that samples are taken at regular intervals along each sensor track even though the document is skewed when passing the A and B sensors.

Figure 4E:
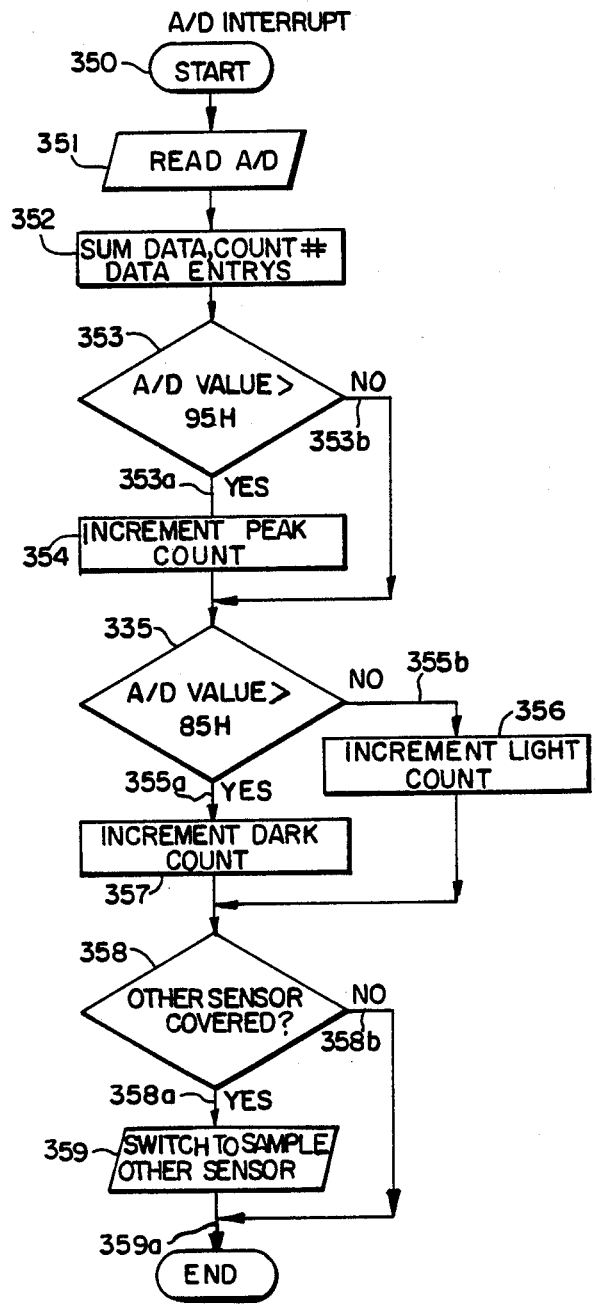
Figure 4C:
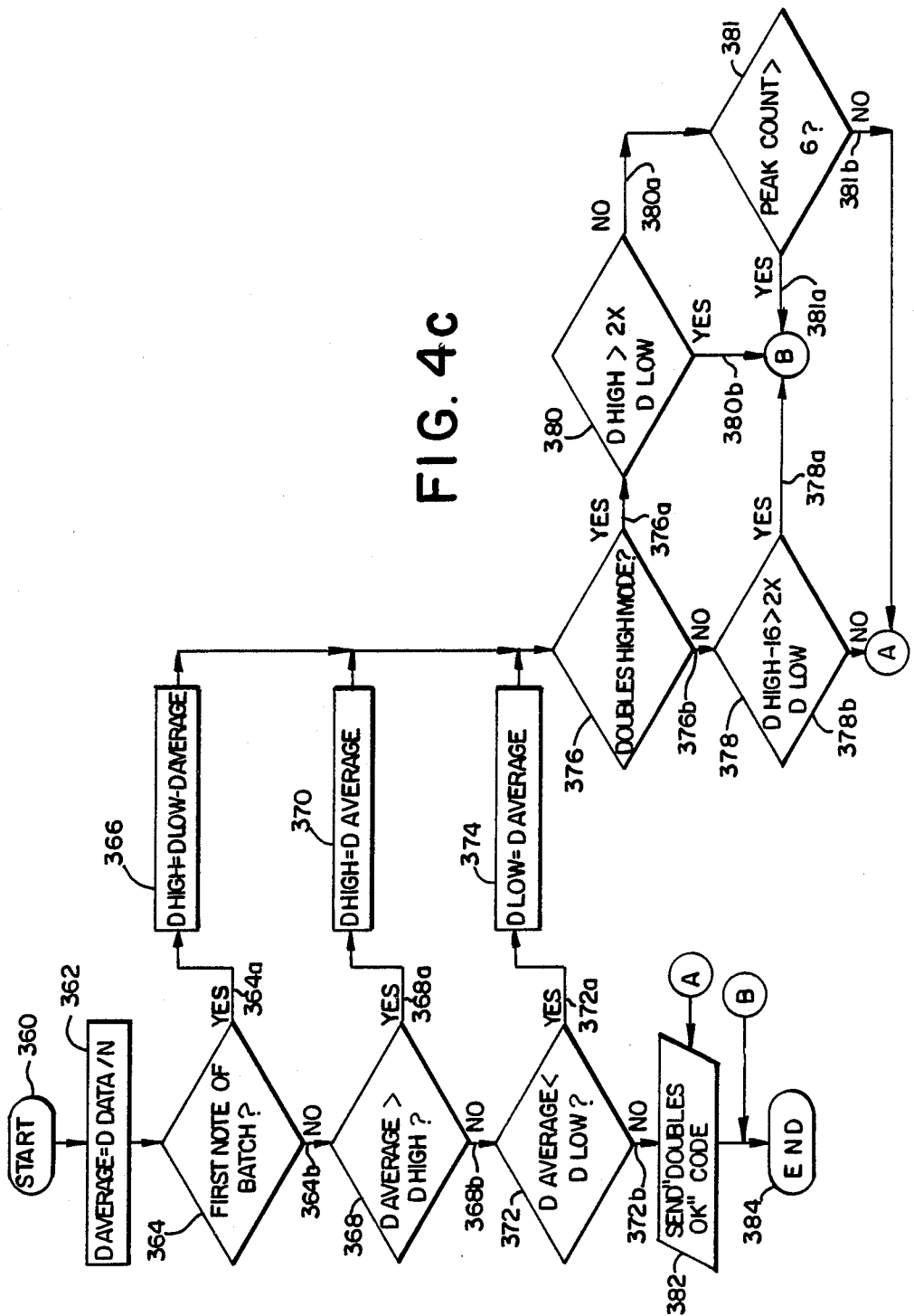
Figure 4D:
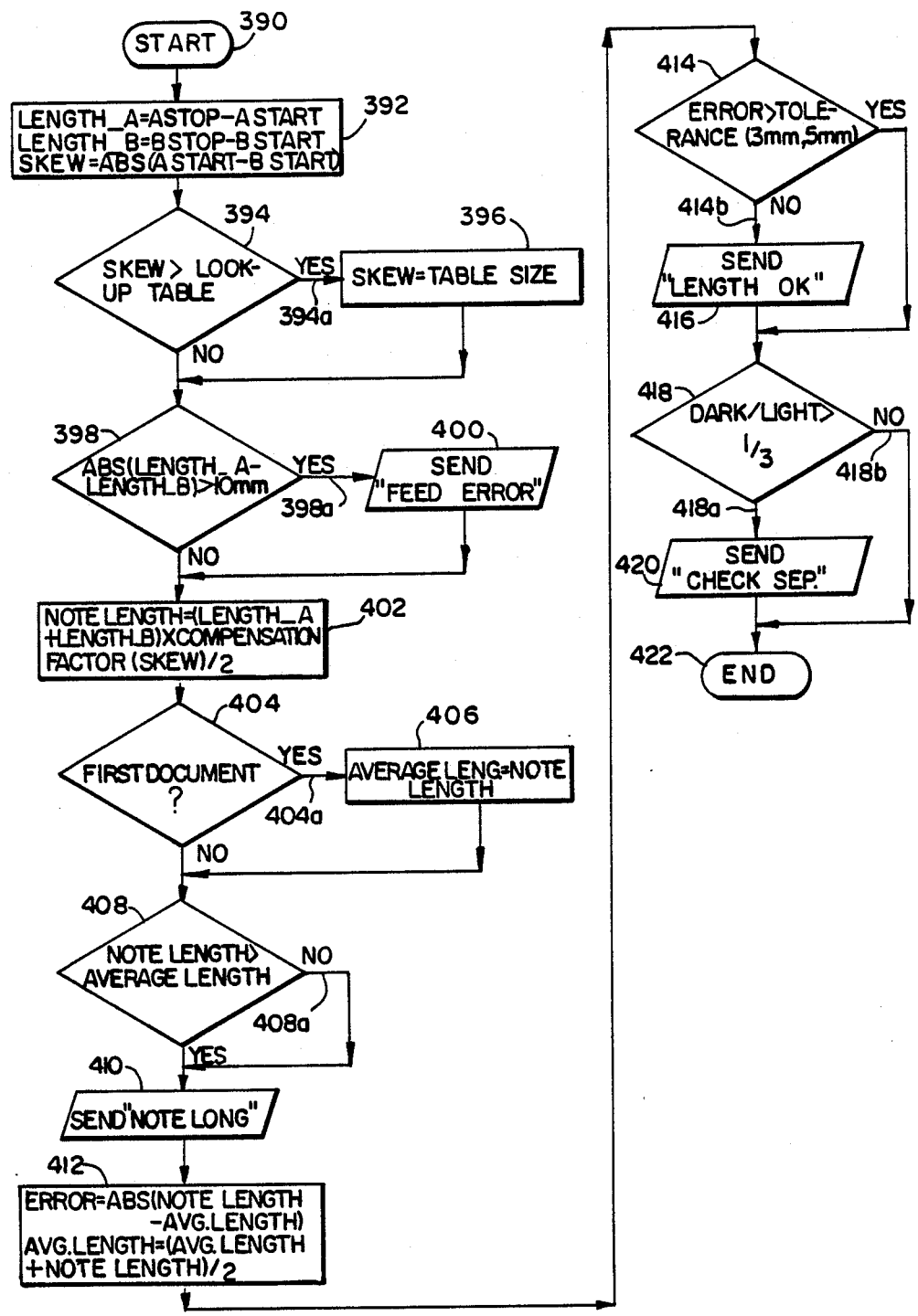

When the A/D converter generates an interrupt signal, the slave processor 100 enters the A/D interrupt routine shown in FIG. 4e. When the interrupt signal occurs, the program enters the routine at 350, reads and transfers the digital output developed by the A/D converter at 351 to the slave processor CPU 102; and at 352, sums the sampled digital value with previous sampled digital values received from the A/D converter and counts the number of digital entries so far received. Thereafter the CPU compares each sampled value against a high threshold at 353 (the value in the preferred embodiment being given in hexadecimal notation - "H"). If the sampled value exceeds this threshold the program branches at 353a to increment a peak count at 354. If this threshold is not exceeded, the CPU branches at 353b and the peak count is not incremented. At step 355 the A/D/ value is compared against a second threshold. If this threshold is exceeded, the program branches at 355a to increment a dark count (357). If this second threshold is not exceeded, the program branches at 355b to increment the light count (356). The other sensor is then examined at 358. If it is covered the program branches at 358a to select the other sensor at 359 and thereafter leave the subroutine at END. If the other sensor is uncovered, the routine branches to End through 358b. Thus, the sensors A and B are selected in an alternating fashion and sampled whenever a document covers the selected sensor.

As was mentioned hereinabove, when both trailing edge signals have been detected at step 334, doubles evaluation is entered at step 336. The doubles evaluation routine is shown in detail in FIG. 4c. The program branches from 336 to step 360 entering the doubles evaluation routine whereupon, at step 362, the density average is obtained by dividing the sum of the digital data derived from A/D converter 108 by the number of digital data entries obtained at step 354 of the routine shown in FIG. 4e to obtain an average density value.

The slave processor 100 determines if the note just examined is the first note of the batch at 364. If it is the first note which has just been evaluated, the average value is stored as both the low density and the high density value, to initiate the evaluation program at 366.

From step 366 the program advances to step 376 to determine if the doubles evaluation is to be performed in high or low mode (determined by the master processor 50). If in the high mode, the value stored as the high density value is compared against two times the value stored as the low density value. If not greater, the program branches at 380a to step 382 to transmit the "doubles okay" code, together with an interrupt bit, to the master processor 50 according to step 338 shown in the FIG. 4b flow chart.

In the event that the master processor 50 is operating in the doubles low mode, the program branches at 376b and compares the difference between the high density value (HDV) and 16 (i.e. HDV-16) against twice the low density value. If the high density value minus 16 (HDV-16) is greater than twice the low density value, the program branches at 378a to step 384 through B—B wherein the slave processor 100 exits the routine of FIG. 4c and reenters the routine of FIG. 4b at step 340. Thus if the density value is greater than a predetermined value for either the high or the low density evaluation mode, the slave processor exits the routine of FIG. 4c and enters the routine of FIG. 4b at step 340.

On the other hand, if the value evaluated is less than the predetermined value, the slave processor enters the routine of FIG. 4b after first sending the "doubles okay" code. Note that no code is transmitted if the density evaluation indicates a double is present. If desired, the opposite technique may be used.

When the next paper bill passes the A and B sensors, and assuming the next paper bill is not the first note of a batch, the program, which is initiated at step 360, branches at 364b and examines the average density of the present bill against the previously stored high value which, in the example given, would be the density value for the first bill of the batch, which value was previously stored as the high value as well as the low value. If the average value just calculated is greater than the previously stored high density value, the program branches at 368a and the average value just determined is stored as the high density value at 370 and steps 376 through 380 are repeated in the same manner as was set forth hereinabove. If the stored high density value is less than twice the stored low density value (380) the program branches at 380a to examine the number of peak samples counted. If the sum of peak values is less than 6 (381) the program branches at 381a and through A—A transmits a "double OK" code at 382. If the sum of peak values counted is greater than 6 the program jumps to 384 through B—B and does not generate a "double OK" count. Thus if more than 6 of the density samples of a sheet are greater than a peak threshold the sheet is classified as a "double".

If the average value just determined is less than the previously stored high density value (note that it cannot be both higher and lower than the stored first values), the program branches at 368b and, at 372, compares the stored high density value against the stored low density value. If the last obtained average density value is less than the stored low density value, the last-obtained average density value is stored as the present low density value at 374 and steps 376 through 380 are repeated in the same manner as was previously described.

If the last-obtained average density value is greater than the previously stored low density value, the slave processor 100 branches at 372b to send a "doubles okay" code, together with an interrupt bit, at step 382. The steps 376 through 380 are bypassed since the average density value just determined is less than the low density value, hence it can clearly not be greater than the stored high density value nor can it be greater than the low density value as established by the criteria set forth in steps 378 and 380.

Thus, the density routine continously compares the stored low density value and high density value with the last-obtained average density value for each bill examined and updates these stored values when appropriate. The lowest low density value received to date establishes the criteria for the evaluation of subsequent bills whose values are compared against the stored low density value plus a predetermined factor whenever the last received average density value is greater than the highest density value presently being stored (via steps 368, 370 and 376-380). When the average density value for the last bill examined is less than the previously stored high and greater than the low density value, a "doubles okay" signal is generated (see steps 368, 372 and 382. When the average density value of the last examined bill is less than the previously stored high value and less than the previously stored low value, its value becomes the stored low value and the last stored high density value is compared against the newly stored low density value (see branch steps 380b and 378a), bypassing the generation of a "doubles okay" code which is detected as the presence of a double by the master processor 50, indicating that either the last examined bill or some bill examined prior thereto and during the examination of the present batch of bills, is a "double". Thus, the slave processor 100 utilizes an adaptive technique in which the bills in the batch of bills presently being examined serve as the criteria for establishing a doubles condition.

FIG. 4d shows the flow chart for evaluating the length data accumulated in accordance with the process steps of the flow chart shown in FIG. 4a. Length evaluation is initiated at step 342 shown in FIG. 4b at which time the program enters step 390 of FIG. 4d and advances to step 392 to obtain the length A, the length B and the skew values. The length A value is determined by subtracting the previously obtained A start value from the A stop value. The length B is similarly determined by subtracting the previously obtained B start value from the B stop value and the skew value is determined by subtracting the B start value from the A start value, the skew value being the absolute value of this difference.

The slave processor 100 advances to step 394 at which time the skew value (b) is compared with the stored value of the look-up table. If the skew value is greater than the maximum look-up table value, the program branches at 394a where the skew value is taken as the table size. If the skew value is less than the maximum range of the look-up table, the skew factor corresponding to the skew value address is taken from the table look-up memory, typically in ROM 106, and stored.

Thereafter, the absolute value of length A minus length B is compared against a factor, in one preferred embodiment 10 millimeters. If the absolute value is greater than 10 millimeters, the program branches at 398a to send a "feed error" signal, generated at 400, to the master processor.

If the absolute value of the difference between length A and length B is less than 10 millimeters, indicating an acceptable bill, the program branches at 398b, and at 402, calculates a note length which is the sum of length A plus length B times the compensation factor divided by two, i.e. $[(A+B)f(b)/2)]$. The program advances to step 404 and, if the document examined is the first document, the note length is stored as the average length. If the document is not the first document, the program branches at 404b to step 408. At 408 the note length calculated at step 406 is compared against the stored average length. If the note length is less than the average length, which, in the case of the first document, the note length and the average length are the same, the program will branch at 408a to step 412. If the note length is greater than the average length, which may only occur on the second or subsequent examined bills, the program branches at 408b to step 410 to send the "note long" signal. Thereafter, at step 412, the error value is calculated which is the absolute value of the note length minus the stored average length, wherein the average length is determined by the value of the last stored average length plus the present note length divided by two. The calculated error value is then compared, at step 414, against a tolerance value which is determined by the master processor when it transmits the note variables data to the slave processor, at step 244 shown in the FIG. 3 flow chart.

If the error value is greater than the selected tolerance, which, in the preferred embodiment, is either 3 millimeters or 5 millimeters, which value is selected by the operator (tolerance key) and then transmitted to the slave processor from the master processor prior to counting, the program branches at 414a and at 418 returns to the next program step to be performed by the slave processor which is the return to step 306 from step 342 shown in the flow chart of FIG. 4b.

In the event that the calculated error is less than the selected tolerance value, the program branches at 414b to step 416 to transmit a "length okay" signal after which the program advances to step 418 to return to the main program shown in the FIG. 4b flow chart.

The master processor operates the document handling and counting apparatus 10 (FIG. 1) in accordance with the evaluation codes received from the slave processor to halt the feeding apparatus at step 252 in the event that the last bill examined was either a double or an unacceptable length or a severely skewed bill. Alternatively, if the last bill examined was not in error, the examination of the remaining bills in the batch continues at least until all of the sheets of the input tray have been processed or until a batch is completed (if the apparatus 10 is in a batch mode).

The density evaluation scheme is also utilized to check the presence of a check separator. A check separator is a special sheet of a fixed size and which contains a large black stripe of significant width. The check separator is placed in a batch to halt the apparatus 10 and thus prevent the sheets on top of the check separator from reaching the output stacker until the previous batch has been removed from the output stacker. The stripe runs the length of the sheet so that the stripe crosses both the A and B sensors in a direction transverse to the length of the stripe. The density of the stripe is sufficient to provide density readings which yield an average density for the check separator sheet which is sufficient to indicate the presence of a check separator and hence halt the feeding operation.

The digital values generated by A/D converter 108 are compared against a predetermined threshold as described in conjunction with FIG. 4c. If the digital value is greater than said threshold, the value is designated as "dark" by a binary "1". If less than the threshold, the examined value is designated as "light" by a binary "0". These binary values are separately summed and stored. When the trailing edge of the sheet passes the A+B sensors the "dark" and "light" values (between 20 and 50 values) which have been separately summed and stored are compared at step 418. If the sum of the dark values is greater than one-half the sum of the light values, the program branches at 418a and the sheet just examined is identified as a check separator at step 420 and the slave processor transfers a code to the master including an interrupt bit, causing the master to halt the feeding of checks. If the dark density values are not at least one third of the total number of sampled values, the program branches at 418b whereby the "check separator" code is not generated. The routine of FIG. 4d is completed at 422 and the slave processor returns to the routine which looks for the leading edge of the next sheet (see FIG. 4a).

The components employed in the electronic control system shown in FIG. 2a and 2b may be the following:

| Device | Manufacturer | Model No. |
|---|---|---|
| PIO (58, 60, 62, 110) | Mostek | MK 3881 |
| CPU (52, 102) | Mostek | MK 3880 |
| CTC (112) | Mostek | MK 3882 |
| A/D Converter (108) | National Semiconductor | ADC 0804 |
| RAM (54, 104) | Toshiba | TMM 2016AP |
| ROM (56, 106) | Intel | 2764 |

Any other devices having operating characteristics may be employed as alternatives to the devices set forth above.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A method for evaluating sheets moving in spaced relation along a nominal feed path past first and second sensors spaced a predetermined distance apart along a line substantially perpendicular to said feed path comprising the steps of:
    generating a first count representing the interval between the times the leading and trailing edges of a sheet pass the first sensor;
    generating a second count representing the interval between the times the leading and trailing edges of said sheet pass the second sensor, said first and second counts representing first and second length values,
    determining the absolute difference between said counts, and
    generating an error signal when said absolute difference exceeds a predetermined value.

2. The method of claim 1 further comprising the steps of:
    determining a skew factor from the absolute value of the difference between the first and second counts;
    converting the skew factor into a compensation factor which is a function of the skew angle; and
    determining the true length of the sheet employing the skew factor and the first and second length values.

3. The method of claim 2 wherein the step of determining actual sheet length further comprises the steps of summing the first and second lengths and multiplying said sum by a value equal to one-half the compensation factor to determine actual note length;
    storing the actual note length as the average length for the first sheet being examined;
    comparing the note length and average length and generating a note long signal when the note length is greater than the average length by a predetermined value.

4. The method of claim 3 further comprising the steps of subtracting the stored average length value from the last determined note length value to generate an error value and updating the average length value based on the last stored average length value and the last determined note length value and storing the updated average length value;
    comparing the error against a tolerance value and generating a length okay signal if the error is less than the tolerance value.

5. The method of claim 3 further comprising the steps of comparing the note length for successive sheets against the last stored average note length;
    generating a note long signal if the note length last determined is greater than the average note length;
    generating an error signal representing the absolute value of the difference between the note length and the average note length and generating an updated average note length based on the last stored average note length and the last determined note length and comparing the error value against the tolerance value;
    generating a length okay signal if the error value is greater than said tolerance value.

6. A method for determining the presence of multiple feed sheets in sheet handling and counting apparatus comprising input and output locations and means for feeding sheets from said input location to said output location along a predetermined feed path in a one-at-a-time fashion, said sheets being fed along said feed path in a spaced apart manner, first and second sensor means being arranged at spaced intervals along an imaginary line perpendicular to said feed path for measuring sheet transmissivity, said method comprising the steps of:
    sampling the outputs of said sensors at periodic intervals after the leading edge of a sheet has passed both of said sensors;
    summing all of the sampled values obtained from said sensors;
    counting the total number of sampled values obtained;
    dividing the sum by the number of values obtained to obtain an average value when the trailing edge of the sheet has passed at least one of said sensors;
    remembering the average value as both the high and low value when the sheet passing the sensors is the first sheet of a batch to be examined;
    comparing the average value against the remembered high value;
    replacing the remembered high value by the last obtained average value whenever the last obtained average value is greater than the remembered high value;
    replacing the remembered low value by the last obtained average value whenever the last obtained average value is less than the remembered low value;
    comparing the remembered high value against the remembered low value times a predetermined factor; and
    generating a doubles okay signal whenever the remembered high value is less than the remembered low value times said factor.

7. The method of claim 6 further comprising the steps of comparing the average density value of each subsequent sheet passing the sensors with the stored high and low values;
    replacing the stored high value with the last-obtained average value generated whenever the last-obtained average value is greater than the stored value;
    replacing the stored low value with the last-obtained average value whenever the last-obtained average value is less than the stored low value;
    repeating the step of comparing the stored high value with a predetermined value which is a function of the stored low value for generating a doubles okay signal only when the stored high value is greater than the said predetermined value.

8. The method of claim 7 wherein said predetermined factor is twice the stored low value.

9. The method of claim 7 wherein the predetermined value is selected from a plurality of predetermined values.

10. The method of claim 7 wherein the step of comparing the stored high value with a predetermined value further comprises the step of multiplying the stored low value by a predetermined factor and thereafter comparing the stored high value with the result of the aforesaid multiplication operation.

11. The method of claim 7 wherein the step of comparing the stored high and low values further comprises the steps of subtracting a predetermined quantity from stored high value and comparing the result against a value equal to twice the stored low value.

12. The method of claim 11 wherein said predetermined value is 16.

13. The method of claim 7 wherein the step of obtaining each sampled value further comprises the steps of sampling the analog signal generated by said sensors and converting said sampled analog signal into a multi-bit digital signal representative of said analog signal.

14. The method of claim 13 wherein the step of storing said sampled value further comprises storing said sample values in said digital form.

15. The method of claim 6 wherein the step of sampling the outputs of said sensors further comprises the steps of sampling said sensors in an alternating fashion.

16. The method of claim 15 wherein the alternate sampling step further comprises the step of initiating a sampling operation as soon as the leading edge of a sheet is detected by a least one of the sensors;
and taking a sample from the selected sensor only when a sheet is covering the selected sensor.

17. A method for evaluating and counting sheets employing apparatus including input and output locations and means for feeding sheets one at a time from said input location to said output location along a feed path arranged therebetween, first and second sensors spaced a predetermined distance apart along an imaginary line substantially perpendicular to said feed path for measuring transmissivity, a master processor comprising a first CPU and memory means for controlling the feeding and counting operations and a slave processor comprising a second CPU and memory means for evaluating the passing sheets for density and length, said master and slave processors being operated in accordance with a method comprising the steps of:
operating the msater processor to scan the input keyboard and remembering the status values of the operated keys;
transferring the operating variables to the slave processor;
starting the operation of the sheet feeding apparatus;
operating said slave processor to examine the sensor signal for each sheet for sheet density and sheet length;
transmitting a message to the master processor identifying the status of the sheet density and sheet length for the examined sheet and repeating said operations for each successive sheet, said message indicating that the sheets either meet or fail to meet the doubles and length criteria;
operating the master processor to examine the sensors;
examining the message received from the slave processor when the sensors indicate that the leading edge of a sheet has passed at least one of the sensors;
stopping the feed apparatus when the message received from the slave processor indicates either unacceptable length or density of the last examined bill;
incrementing the sheet count when the message from the slave processor indicates an acceptable bill;
transmitting a new note signal to the slave processor when the leading edge of a sheet passes the sensors;
operating said slave processor to initiate a density examination upon receipt of the new note signal from the master processor.

18. Apparatus for handling and counting sheets and for determining the fitness of said sheeets comprising:
an input tray;
an output tray;
feed means for advancing sheets from the input tray along a feed path to the output tray in a one at a time fashion;
first and second sensors spaced a predetermined distance apart along an imaginary line substantially perpendicular to said feed path for measuring transmissivity;
a master processor including a first CPU;
a slave processor including a second CPU;
means for selectively transferring data between said master and slave processors;
means for selectively coupling the master processor to said sensors;
means for selectively coupling said slave processor to said sensors;
means in said master processor for selecting fitness criteria for the sheets to be examined;
means in said master processor for transferring the fitness criteria to the slave processor;
means in said slave processor for establishing the criteria for evaluating sheets dependent upon the message received from said master processor;
means in said slave processor responsive to said sensors for determining the fitness of evaluated sheet, including means for transferring a message to the master processor representing the evaluation of each sheet;
means in said master processor for halting said feed means responsive to a message from said slave processor indicating the presence of an unfit sheet;
said master processor further including means for incrementing a sheet count when said sensors have detected the passing of the traiing edge of a sheet and the absence of an unfit message form the slave processor.

19. The apparatus of claim 18 wherein said slave processor further comprises means responsive to said sensor for determining sheet density;
means for comparing the density of each sheet with the density of sheets previously examined to determine the higher density value;
means for comparing the density of each sheet with the density of the previously examined sheets to determine the lower density value;
means for storing the higher and lower density values;
means for comparing the stored high and low density values for generating a signal when the difference therebetween is greater than a predetermined value.

20. The apparatus of claim 18 further comprising encoder means for generating pulses at a repetition rate representative of the speed at which said sheets are feed;
means for counting said pulses when a sheet is detected by said sensors;
means for generating an updated average of sheet length from the sheet length values for each last examined sheet and the previously examined sheet;
means for comparing the sheet length of each sheet against the average value, including means for generating a signal when the difference therebetween exceeds a predetermined quantity;
said master processor including means responsive to said signal for halting said feed means.

21. The apparatus of claim 20 further comprising analog to digital convertor means for converting the sensor output signal into digital form at predetermined intervals, said analog to digital convertor means generating an interrupt signal at each of said predetermined intervals;
said slave processor including means responsive to each interrupt signal for storing each such digital value;
said master processor including means for transferring a new note signal to said slave processor responsive to the passing of a leading edge of a sheet by said sensor means;
said slave processor including means responsive to said new note signal to enable said slave processor to recognise an interrupt signal from said analog to digital convertor;
said means responsive to said interrupt signals further summing each digital value to the last received digital value and counting the number of interrupt signals;
means for generating an average value by dividing the sum of said digital values by the number of interrupt signals.

22. The apparatus of claim 20 further comprising counter means, said slave processor further comprising means responsive to the presence of a note detected by said sensors for loading a value into said counter means;
clock means for altering the value in said counter means;
means responsive to the presence of a sheet when the altered value differs from said load value by a predetermined quantity for generating a jam condition signal; and
said master processor further comprising means responsive to a jam condition generated by said slave processor for halting said feed means.

23. A method for evaluating and counting sheets fed one at a time along a feed path from an input location to an output location including the steps of:
placing a batch of sheets to be evaluated in said input location;
placing a separator sheet having a wide dark stripe extending along said sheet in a direction transverse to said feed path into a selected location within said batch of sheets;
obtaining sheet density values at a plurality of intervals as each sheet moves along said path between said input and output locations;
comparing each of said density values with a threshold value;
classifying those density values greater than said threshold value as being of one binary state and those density values which are less than said threshold value as being of the opposite binary state;
individually summing the number of binary values of each state;
comparing the sum of values corresponding to one binary state with the sum of values corresponding to the other binary state;
generating a half signal if the sum of the values which are darker than said threshold value is greater than the product of a factor times the sum of the values which are lighter than said threshold value;
said stripe being sufficiently dark to result in the generation of a halt signal.

24. The method of claim 23 wherein said factor is 0.5.

* * * * *

UNITED STATES PATENT AND TRADEMARK OFFICE
CERTIFICATE OF CORRECTION

PATENT NO. : 4,741,526
DATED : May 3, 1988
INVENTOR(S) : John M. Reed

It is certified that error appears in the above-identified patent and that said Letters Patent are hereby corrected as shown below:

```
Column 17, line 52 - "msater" should be --master--.

Column 18, line 17 - "sheeets" should be --sheets--.

line 53 - "traiing" should be
                     --trailing--.

line 54 - "form" should be --from--.

Column 20, line 36 - "half" should be --halt--.
```

Signed and Sealed this

Twentieth Day of September, 1988

Attest:

DONALD J. QUIGG

*Attesting Officer*     *Commissioner of Patents and Trademarks*